United States Patent
Bordes et al.

(10) Patent No.: US 9,699,426 B2
(45) Date of Patent: Jul. 4, 2017

(54) METHOD AND DEVICE FOR ESTIMATING A COLOR MAPPING BETWEEN TWO DIFFERENT COLOR-GRADED VERSIONS OF A PICTURE

(71) Applicant: THOMSON LICENSING, Issy les Moulineaux (FR)

(72) Inventors: Philippe Bordes, Laille (FR); Sebastien Lasserre, Thorigne Fouillard (FR); Pierre Andrivon, Liffre (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/956,311

(22) Filed: Dec. 1, 2015

(65) Prior Publication Data

US 2016/0155243 A1    Jun. 2, 2016

(30) Foreign Application Priority Data

Dec. 1, 2014  (EP) .................... 14306931

(51) Int. Cl.
  *G06K 9/00*  (2006.01)
  *H04N 9/64*  (2006.01)
  *H04N 1/60*  (2006.01)

(52) U.S. Cl.
  CPC ............. *H04N 9/64* (2013.01); *H04N 1/6058* (2013.01); *G06T 2207/10024* (2013.01)

(58) Field of Classification Search
  CPC .... H04N 19/98; H04N 19/186; H04N 11/002; H04N 11/20; H04N 5/57; H04N 9/3182; H04N 9/69; G06K 9/4652; G06T 2207/20208
  See application file for complete search history.

(56) References Cited

U.S. PATENT DOCUMENTS

| | | | |
|---|---|---|---|
| 7,835,588 B2 | 11/2010 | Parkkinen et al. |
| 8,026,953 B2 | 9/2011 | Lammers et al. |
| 8,537,177 B2 | 9/2013 | Bhaskaran et al. |
| 8,860,747 B2 | 10/2014 | Bhaskaran et al. |
| 2005/0021957 A1 | 1/2005 | Gu |
| 2008/0089581 A1 | 4/2008 | Pitie et al. |
| 2013/0038790 A1 | 2/2013 | Seetzen et al. |
| 2013/0044122 A1 | 2/2013 | Ho et al. |

(Continued)

FOREIGN PATENT DOCUMENTS

WO   WO2014075943   5/2014

OTHER PUBLICATIONS

Boyce et al: "Draft high efficiency video coding (HEVC) version 2, combined format range extensions (RExt), scalability (SHVC), and multi-view (MV-HEVC) extensions" JCTVC-R1013, 18th Meeting: Sapporo, JP, Jun. 30-Jul. 9, 2014; pp. 1-514.

(Continued)

*Primary Examiner* — Eueng-Nan Yeh
(74) *Attorney, Agent, or Firm* — Brian S. Dorini, Esquire; Paul P. Kiel, Esquire

(57) ABSTRACT

A method and device for processing a picture comprises estimating a color mapping between a first and a second color-graded version of the picture by estimating a color mapping function that maps the color values of the first color-graded version of the picture onto the color values of the second color-graded version of the picture.

13 Claims, 3 Drawing Sheets

(56) References Cited

U.S. PATENT DOCUMENTS

2013/0076763 A1\*  3/2013  Messmer ............. H04N 1/6058
                                                  345/506
2014/0044372 A1\*  2/2014  Mertens ................ H04N 19/46
                                                  382/248
2014/0210847 A1    7/2014  Knibbeler et al.

OTHER PUBLICATIONS

Hwang et al: "Color transfer using probabilistic moving least squares" 2014 IEEE Conference on Computer Vision and Pattern Recognition Jun. 23, 2014 (Jun. 23, 2014); pp. 3342-3349.
Search Report Dated May 27, 2015.

\* cited by examiner

METHOD AND DEVICE FOR ESTIMATING A COLOR MAPPING BETWEEN TWO DIFFERENT COLOR-GRADED VERSIONS OF A PICTURE

This application claims the benefit, under 35 U.S.C. §119 of European Patent Application No. 14306931.8, filed Dec. 1, 2014.

1. FIELD

The disclosure relates to the color mapping domain. In particular, it relates to a method for estimating a color mapping between a first color-graded version of a picture and a second color-graded version of said picture.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A color gamut is a certain complete set of colors. The most common usage refers to a set of colors which can be accurately represented in a given circumstance, such as within a given color space or by a certain output device.

A color volume is defined by a color space and a dynamic range of the values represented in said color space.

For example, a color volume is defined by a RGB ITU-R Recommendation BT.2020 color space and the values represented in said RGB color space belong to a dynamic range from 0 to 4000 nits (candela per square meter). Another example of color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamut) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for Ultra-High Definition Television systems (UHDTV).

Then, a Colorist, usually in conjunction with a Director of Photography, performs a control on the color values of the first color-graded version of the captured picture by fine-tuning/tweaking some color values in order to instill an artistic intent.

A second color-graded version of the captured picture is also obtained to get home release renders (using specific home, Blu-Ray Disk/DVD grade). Typically, the values of the second color-graded version of the captured picture are represented according to a standardized YUV format such as ITU-R Recommendation BT.601 (Rec. 601) which defines studio encoding parameters of Standard Digital Television for standard 4:3 and wide-screen 16:9 aspect ratios, or ITU-R Recommendation BT.709 which defines parameter values for High Definition Television systems (HDTV).

Obtaining such a second color-graded version of the captured picture usually comprises stretching the color volume of the first color-graded version of the captured picture (for example RGB BT.2020 1000 nits modified by the Colorist) in order that the second color-graded version of the captured picture belong to a second color volume (RGB BT.709 1000 nits for example). This is an automatic step which uses a default color mapping function (for example for mapping of RGB BT.2020 format to RGB BT.709) usually approximated by a three dimensional look-up-table (also called 3D LUT). Note that all the considered YUV formats are characterized with the Color primaries parameters that allow defining any RGB-to-YUV and YUV-to-RGB color mappings.

Then, a Colorist, usually in conjunction with a Director of Photography, performs a control on the color values of the second color-graded version of the captured picture by fine-tuning/tweaking some color values in order to instill the artistic intent in the home release.

It is known to explicitly signal a default color mapping to a display, such as the YUV-to-RGB color mapping, so that the display is able to apply the appropriate default color mapping. Moreover, when the color mapping uses parameters calculated from a first and second color-graded version of a picture, it is known that those parameters are also signaled to the display so that the display is able to apply the appropriate default color mapping with appropriate parameters.

Using a default color mapping fails to preserve the artist intent because some colors, as specified by the colorist, in the first or second color-graded version of a picture may not be preserved when the default color mapping is applied on the first color-graded version of the picture.

For example, memory color such as flesh or skin tones, blue sky or green grass shades . . . etc, should be preserved when specified by the colorist for a given grade.

There is thus a need of a method for estimating a color mapping between two different color-graded versions of a picture which preserves the artist intent.

Estimating a color mapping between two color-graded versions of a same picture means estimating a color mapping function that optimally maps the color values of the first color-graded version of the picture onto the color values of the second color-graded version of said picture.

Estimating a color mapping function which comprises at least one color transform may result in obtaining output color values which are saturated i.e. exceed a given maximal value and/or obtaining intermediate values exceeding a dynamic range of the final output values. Said saturated output or intermediate color values are obtained by applying an estimate of a color transform to input color values. They correspond to input color values which are all mapped onto a same color value. Consequently, the color-mapped version of either the picture or an intermediate picture comprises areas with a constant color value which degrade the visual aspect of the color-mapped picture.

3. SUMMARY

In light of the foregoing, aspects of the present disclosure are directed to creating and maintaining semantic relationships between data objects on a computer system. The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for processing a picture comprising estimating a color mapping between a first and a second color-graded version of said picture by estimating a color mapping function that maps color values of said first color-graded version of said picture onto color values of the second color-graded version of said picture. Said color mapping function comprising at least two color transforms, the color values of the first color-graded version of the picture being represented in a first color volume and the color values of the second color-graded version of said picture being represented in a second color volume, the method is characterized in that estimating said color mapping function comprises:

a) obtaining an estimate of each color transform from the color values of said first and second color-graded version of said picture;

For the estimate of each color transform, b) obtaining an intermediate output set of color values by applying said estimate of the color transform to the color values of the input set of color values used for estimating said color transform;

c) detecting whether a color value of the intermediate output set of color values exceeds a given maximal value;

d) when at least one color value of the intermediate output set of color values exceeds the given maximal value, reducing the dynamic range of the color values of the intermediate output set of color values and going back to step a).

This avoids saturation of color values which are obtained by multiplying the color values of the first color-graded version of the picture by an estimate of the color mapping function. Thus a better estimate of the color values of the second color-graded version of the picture is obtained and a better visual aspect of the color-mapped picture compared to the result obtained by applying a usual clipping to the saturated color values.

According to an embodiment, reducing the dynamic range of the color values of the intermediate output set of color values by multiplying the estimate of the color transform by a scaling factor.

According to an embodiment, reducing the dynamic range of the color values of the intermediate output set of color values by multiplying the color values of the input set of color values used for estimating said color transform by a scaling factor.

According to an embodiment, the scaling factor is the ratio of a given maximal value over the maximum value of the color values of the input set of color values.

According to an embodiment, the method further comprises obtaining an histogram of the color values of the intermediate output set of color values and the given maximal value is then a given percentage threshold of the very higher color values of said histogram.

According to an embodiment, a first set of color values gathering the color values of the first color-graded version of the picture and a second set of color values gathering the color values of the second color-graded version of the picture, and wherein obtaining an estimate of each color transform comprises at iteration k:

a) obtaining a third set of color values by applying a first color transform estimated at iteration k−1 to the first set of color values;

b) estimating a third color transform by mapping the second set of color values onto the third set of color values;

c) obtaining a fourth set of color values by applying said third color transform to the second set of color values;

d) estimating a first color transform by mapping the first set of color values onto said fourth set of color values; said first color transform is used for updating the first color transform previously estimated;

e) obtaining a fifth set of color values by applying said first color transform to the first set of color values; and f) estimating a second color transform by mapping the fifth set of color values onto the second set of color values.

According to an embodiment, the color mapping function is approximated by a three-dimensional look-up-table.

According to an embodiment, at least one color transform is approximated by a one-dimension piecewise linear function defined between a lower and upper bounds.

According to an embodiment, at least one color transform is approximated by a one-dimensional look-up-table.

According to other of its aspects, the disclosure relates to a device comprising a processor configured to implement the above methods, a computer program product comprising program code instructions to execute the steps of the above methods when this program is executed on a computer, a processor readable medium having stored therein instructions for causing a processor to perform at least the steps of the above methods, and a non-transitory storage medium carrying instructions of program code for executing steps of the above methods when said program is executed on a computing device.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present disclosure is illustrated by the following figures:

FIG. 1 shows schematically a method for estimating a color mapping CM between a first color-graded version of the picture whose values are represented in a first color volume and a second color-graded version of said picture whose values are represented in a second color volume according to a specific and non-limiting embodiment of the disclosure;

FIG. 2 schematically illustrates an example of a color mapping function;

Figure 5:
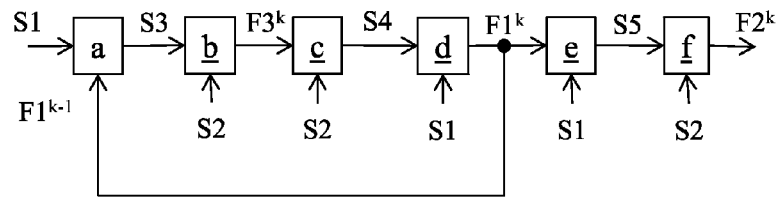
Figure 6:
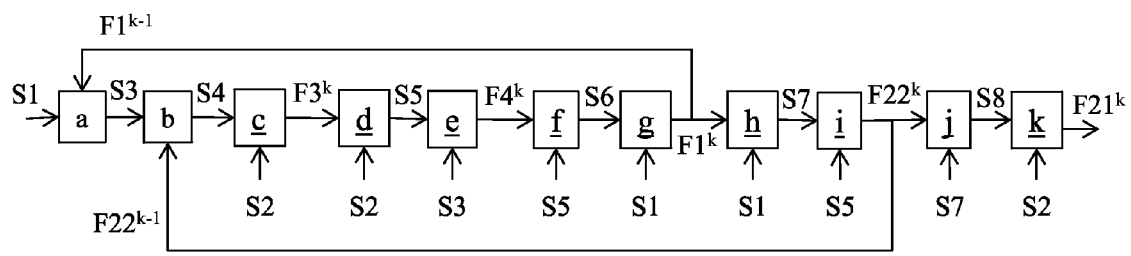
Figure 7:
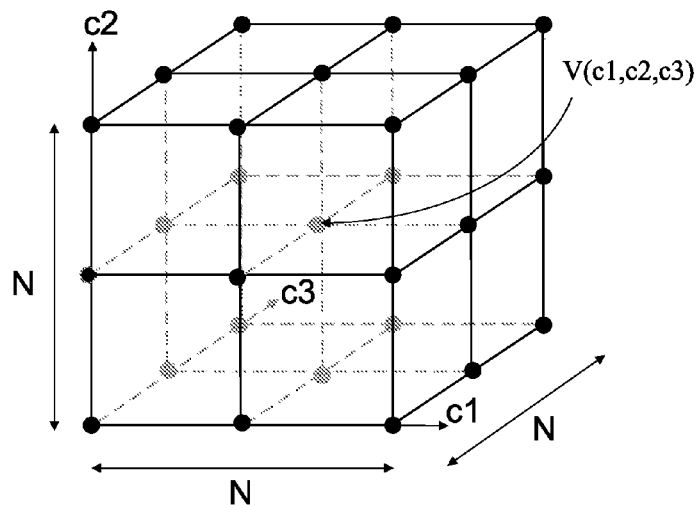
Figure 8:
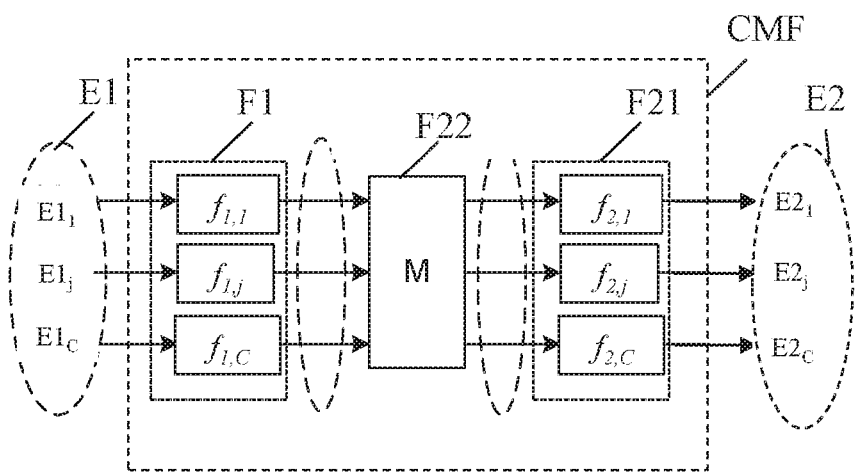
Figure 9:
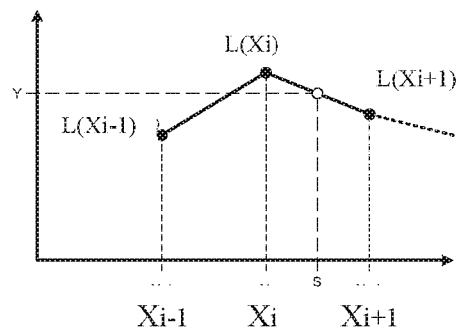
Figure 10:
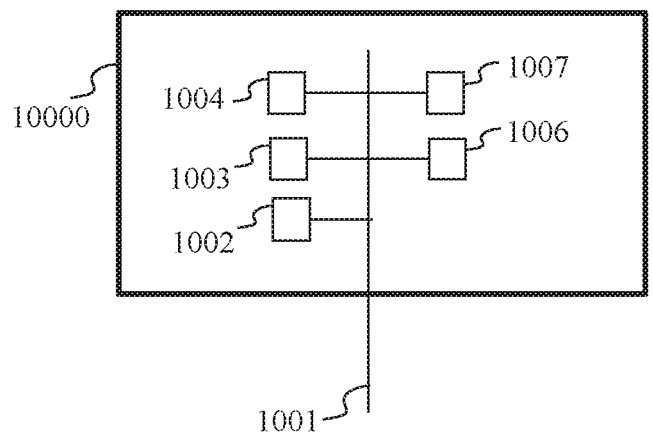

FIG. 5 schematically illustrates an example for estimating a color mapping function comprising two color transforms;

FIG. 6 schematically illustrates an example for estimating a color mapping function comprising three color transforms;

FIG. 7 schematically illustrates an example of a 3D LUT approximating a color mapping function;

FIG. 8 schematically illustrates a color mapping function comprising color transforms approximated by one-dimensional piecewise linear functions and a matrix;

FIG. 9 shows an example of a one-dimensional piecewise linear function f;

FIG. 10 shows an example of an architecture of a device in accordance with an embodiment of the disclosure.

6. DESCRIPTION OF EMBODIMENTS

The present disclosure will be described more fully hereinafter with reference to the accompanying figures, in which embodiments of the disclosure are shown. This disclosure may, however, be embodied in many alternate forms and should not be construed as limited to the embodiments set fourth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for estimating a color mapping between a first color-graded version of a picture and a second color-graded version of said picture but extends to estimating a color mapping between a first color-graded version of pictures of a sequence of pictures and a second color-graded version of pictures of said sequence of pictures because the pictures of said sequence of pictures are sequentially and independently color-mapped as described below.

Estimating a color mapping between a first color-graded version of a picture and a second color-graded version of said picture may be a step of a method for processing a picture or a video.

Figure 1:
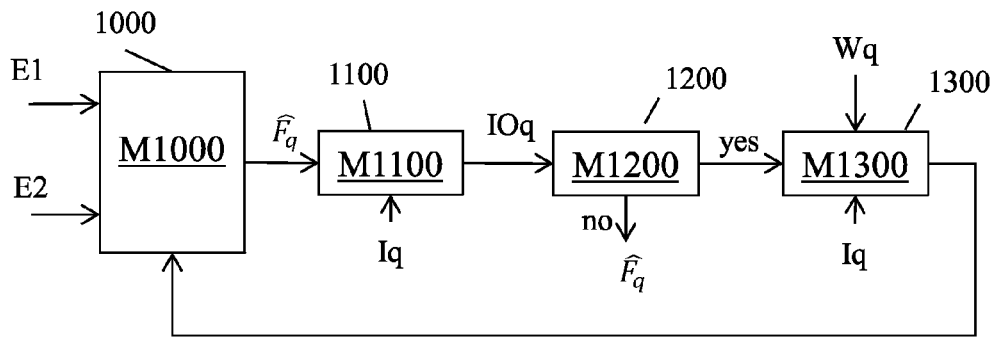

FIG. 1 shows schematically a method for estimating a color mapping CM between a first color-graded version E1 of a picture whose values are represented in a first color volume and a second color-graded version E2 of said picture whose values are represented in a second color volume according to a specific and non-limiting embodiment of the disclosure.

For example, only the dynamic ranges of the first and second color volume are different. The first color volume may be defined, for example, by using a RGB BT.2020 color space and the dynamic range of the values between 0 to 4000 nits (candela per square meter) and the second color volume is defined using a RGB BT.2020 color space and the dynamic range of the values between 0 to 1000 nits (candela per square meter).

According to another example, only the color gamuts of the first and second color volumes are different. The first color volume is defined, for example, by using a RGB BT.2020 color space and the dynamic range of the values between 0 to 1000 nits (candela per square meter) and the second color volume is defined using a RGB BT.709 color space and the dynamic range of the values between 0 to 1000 nits (candela per square meter).

According to another example, only the color spaces of the first and second color volumes are different. The first color volume is defined, for example, by using a RGB BT.2020 color space and the dynamic range of the values between 0 to 1000 nits (candela per square meter) and the second color volume is defined using a YUV BT.2020 color space and the dynamic range of the values between 0 to 1000 nits (candela per square meter).

The disclosure is not limited to these examples of color volumes and it is obvious that the first and second color volumes may be defined having more than one of these differences (color gamut, color space, dynamic range).

Estimating a color mapping CM between two color-graded versions E1 and E2 of a same picture means estimating a color mapping function CMF that optimally maps the color values of the first color-graded version E1 of the picture onto the color values of the second color-graded version E2 of said picture.

Figure 2:
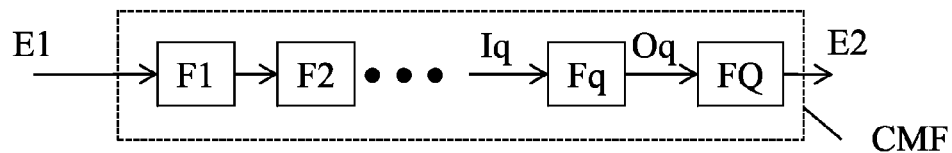

According to the disclosure, illustrated in FIG. 2, the color mapping function CMF comprises at least two color transforms F1, F2, . . . , Fq, . . . , FQ.

In step 1000 on FIG. 1, a module M1000 obtains an estimate $\hat{F}_q$ of each color transform Fq from the color values of said first E1 and second E2 color-graded version of said picture.

For the estimate $\hat{F}_q$ of each color transform Fq, in step 1100, a module 1100 obtains an intermediate output set of color values IOq by applying said estimate $\hat{F}_q$ of a color transform Fq to the color values of an input set of color values Iq used for estimating said color transform Fq.

In step 1200, a module 1200 detects whether a color value of the intermediate output set of color values IOq exceeds a given maximal value MAX.

When at least one color value of the intermediate output set of color values IOq exceeds the given maximal value MAX, in step 1300, a module M1300 reduces the dynamic range of the color values of the intermediate output set of color values IOq, and the step 1000-1300 are then repeated.

According to an embodiment of the step 1300, the dynamic range of the color values of the intermediate output set of color values is reduced by multiplying the estimate $\hat{F}_q$ of the color transform Fq by a scaling factor Wq.

According to an embodiment of the step 1300, the dynamic range of the color values of the intermediate output set of color values is reduced by multiplying the color values of the input set of color values Iq used for estimating a color transform Fq by the scaling factor Wq.

According to an embodiment, the scaling factor Wq is the ratio of a given maximal value MAX over the maximum value MAXq of the color values of the intermediate output set of color values IOq.

Figure 3:
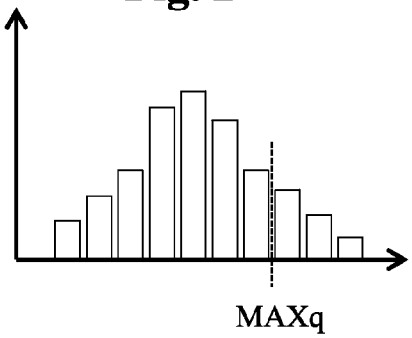
FIG. 3 illustrates a histogram of color values.

According to an embodiment, illustrated in FIG. 3, the method further comprises obtaining a histogram of the color values of the intermediate output set of color values IOq. Each bin of said histogram represents a color value and the ordinate represents the number of occurrences of a color value. The maximal value MAX is then a given percentage threshold of the cumulated very higher color values of said histogram. For example the maximal value MAX is chosen in order that the 20% of the cumulated histogram very higher color values are considered as exceeding said maximal value MAX.

Note the scaling factor Wq may be the same for all the color transforms.

Note that positive color values of the intermediate output set of color values are said saturated when they exceed a positive integer maximal value which may define an upper bound of a given range of values. Moreover, negative color values are said saturated when their absolute value exceeds a positive maximal value which may define a lower bound of the given range of values.

For example, the given maximal value (upper and lower bound) is defined from the maximal color values of the color space of the second color volume.

The given maximal value may also be defined, for example, as the maximum value corresponding to the range value used to store the values (number of bits).

Figure 4:
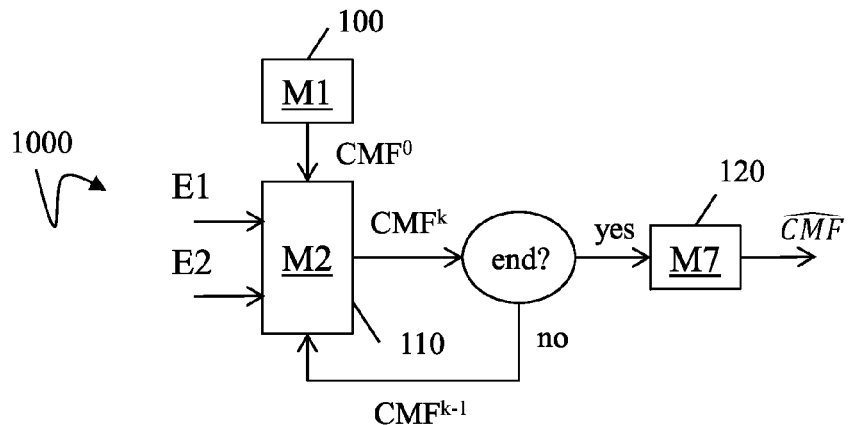
FIG. 4 illustrates an embodiment of the step 1000 for obtaining an estimate of each color transform from the color values of the first and second color-graded versions of the picture.

FIG. 4 illustrates an embodiment of the step 1000 for obtaining an estimate $\hat{F}_q$ of each color transform Fq from the color values of said first E1 and second E2 color-graded version of the picture.

Note that obtaining an estimate $\hat{F}_q$ of each color transform Fq of the color mapping function CMF from the first E1 and second E2 color-graded version of the picture means obtaining an estimate $\widehat{CMF}$ of the color mapping function CMF from the first E1 and second E2 color-graded version of the picture.

In step 100, a module M1 obtains a first estimate CMF⁰ of the color mapping function CMF, i.e. a first estimate $\widehat{F_q^0}$ for each color transform Fq.

According to an embodiment, the first estimate of each color transform is a linear monotonous function and, when a color transform is a linear matrix, the first estimate of the color transform is the identity matrix.

According to another example, the first estimates of the color transforms are color mapping functions that transform the color space of the first color volume to the color space of the second color volume. Such color transforms are defined, for example, by the standard SMPTE RP 177.

Next, in step 110, at an iteration k (k is an integer value), a module M2 obtains an estimate $\widehat{F_q^k}$ for each color transform Fq (an estimate CMF$^k$ of the color mapping function CMF) from the first E1 and the second E2 color-graded versions of the picture using an estimate $\widehat{F_q^{k-1}}$ for each color transform Fq (an estimate CMF$^{k-1}$ of the color mapping CMF) calculated previously (iteration k−1).

The step 110 is repeated until a criterion is reached. A final estimate $\widehat{F_q}$ for each color transform Fq ($\widehat{CMF}$ of the color mapping function CMF) equals to the estimate $\widehat{F_q^p}$ for each color transform Fq (CMF$^p$ of the color mapping function CMF) with p (the last iteration) is thus obtained.

The criterion is reached for example when a maximum number of iterations k is reached or when the Euclidean distance between two successive estimates of the second color-graded version E2 of the picture, obtained by applying estimates CMF$^{k-1}$ and CMF$^k$ of the color mapping function CMF, calculated during two successive iterations, to the first color-graded version E1 of the picture, is below a predefined threshold.

Alternatively, the criterion is reached when the Euclidean distance between an estimate of the second color-graded version E2 of the picture obtained by applying an estimate CMF$^k$ of the color transform function CMF to the first color-graded version E1 of the picture and the second color-graded version E2 of the picture, is below a predefined threshold.

Estimating a color mapping function CMF comprising at least two color transforms means estimating each of said two color transforms.

In the following, a first set of color values S1 means a set which gathers the color values of the first color-graded version E1 of the picture and a second set of color values S2 gathers the color values of the second color-graded version E2 of the picture.

Estimating a color mapping function CMF comprising two color transforms F1 and F2 from the first set of color values S1 and the second set of color values S2 is illustrated in FIG. 5.

Estimating the two color transforms F1 and F2 is an iterative process which comprises for each iteration k, k being an integer:

a) obtaining a third set of color values S3 by applying a first color transform $F1^{k-1}$ estimated at iteration (k−1) to the first set of color values S1;

b) estimating a third color transform $F3^k$ by mapping the second set of color values S2 onto the third set of color values S3;

c) obtaining a fourth set of color values S4 by applying said third color transform $F3^k$ to the second set of color values S2;

d) estimating a first color transform $F1^k$ by mapping the first set of color values S1 onto said fourth set of color values S4; said first color transform $F1^k$ is used for updating the first color transform $F1^{k-1}$;

e) obtaining a fifth set of color values S5 by applying said first color transform $F1^k$ to the first set of color values S1; and f) estimating a second color transform $F2^k$ by mapping the fifth set of color values S5 onto the second set of color values S2.

The disclosure is not limited to a color mapping function CMF comprising a first color transform F1 and a second color transform F2 but extends to any color mapping comprising more than two color transforms.

For illustrative purpose, FIG. 6 illustrates how a color mapping function CMF is estimated when it comprises three color transforms F1, F21 and F22.

For each iteration k, k being an integer:

a) obtaining a third set of color values S3 by applying a first color transform $F1^{k-1}$, estimated at iteration (k−1), to the first set of color values S1;

b) obtaining a fourth set of color values S4 by applying the color transform $F22^{k-1}$, estimated at iteration (k−1), to the third set of color values S3;

c) estimating a third color transform $F3^k$ by mapping the second set of color values S2 onto the fourth set of color values S4;

d) obtaining a fifth set of color values S5 by applying said third color transform $F3^k$ to the second set of color values S2;

e) estimating a fourth color transform $F4^k$ by mapping the fifth set of color values S5 onto the third set of color values S3;

f) obtaining a sixth set of color values S6 by applying said fourth color transform $F4^k$ to the fifth set of color values S5;

g) estimating a first color transform $F1^k$ by mapping the first set of color values S1 onto the sixth set of color values S6; said first color transform $F1^k$ is used for updating the first color transform $F1^{k-1}$;

h) obtaining a seventh set of color values S7 by applying said fourth color transform $F1^k$ to the first set of color values S1;

i) estimating the color transform $F22^k$ by mapping the seventh set of color values S7 onto said fifth set of color values S5; said color transform $F22^k$ is used for updating the color transform $F22^{k-1}$;

j) obtaining a eighth set of color values S8 by applying said color transform $F22^k$ to the seventh set of color values S7; and l) estimating the color transform $F21^k$ by mapping said eighth set of color values S8 onto the second set of color values S2.

It is not mandatory that the last step l) be executed at each iteration. This step shall be executed at least once, after the last iteration.

Note that the set of color values S3-S8 are used either as input or output set of colors for estimating a color transform. For example, when estimating the color transform $F22^k$, the seventh set of color values S7 is an input set of color values and the fifth set of color values S5 is an output set of color values.

According to an embodiment, the step l) is executed at each iteration when, for example, the criterion (to stop or not the iterative method) requires the estimate of the color transform $F21^k$ at each iteration in order to evaluate an Euclidean distance between two successive estimates of the second set of color values S2, one is obtained by applying an estimate $CMF^{k-1}$ of the color mapping function CMF (iteration k−1) to the first set of color values S1, the other one is obtained by applying an estimate $CMF^k$ of the color mapping function CMF (iteration k) to the first set of color values S1. The iteration stops when the Euclidean distance is lower than a threshold.

The principle for estimating color transforms may be easily extended according to FIG. 5 and FIG. 6 to any color mapping function comprising any number of color transforms.

According to an embodiment of the method, the color mapping CMF is approximated by a three-dimensional look-up-table (3D LUT).

This allows few bits for representing the color mapping function CMF leading to reduced coding cost.

FIG. 7 shows schematically an example of a 3D LUT approximating a specific color mapping function CMF.

The 3D LUT associates at least one color value represented in a first color volume with a color value represented in a second color volume (different from the first color volume).

A 3D LUT allows for partitioning the first color volume into a set of regions delimited by the vertices of the 3D LUT. Exemplarily, a 3D LUT associates a set of color values with a triplet of color values in the first color volume. The set of color values can be a triplet of color values in the second color volume or a set of color values representative of the color transform (e.g. locally defined color mapping function parameters) used to transform color values in the first color volume into color values in the second color volume.

On FIG. 7, a square 3D LUT is represented as a lattice of N×N×N vertices. For each vertex V(c1, c2, c3) of the 3D LUT, a corresponding triplet of color values ($V_{c1}$, $V_{c2}$, $V_{c3}$) needs to be stored. The amount of data associated with the 3D LUT is N×N×N×K, where K is the amount of bits used to store one 3D LUT triplet value. The triplet value is for example a (R, G, B) triplet, a (Y, U, V) triplet or a (Y, Cb, Cr) triplet, etc.

According to an embodiment of the method, at least one color transform Fq is approximated by a one-dimensional look-up-table.

This embodiment is advantageous because approximating a color mapping function by a combination of existing one-dimensional non-linear mapping functions already implemented in many screen, displays and TV is possible. They could be used to implement any kind of color transform, e.g. in the case where the color grading is color space dependent.

According to an embodiment of the method, the color mapping function CMF comprises a color transform which is represented by a matrix.

According to a non-limiting embodiment of the method, illustrated in FIG. 8, the color mapping function CMF comprises a color transform F1 which is approximated by C one-dimensional piecewise linear functions $f_{1,j}$ (j∈{1, . . . , C}), a second color transform F21 which is approximated by C one-dimensional piecewise linear functions $f_{2,j}$ (j∈{1, . . . , C}) and a linear matrix M (that may be considered as being another color transform F22). C is an integer number equals to the number of components of the picture. Usually C=3 as illustrated in FIG. 8.

The color transforms F1, F21 and F22 are then estimated as described in FIG. 6 in which the third color transform F3$^k$ is also approximated by C one-dimensional piecewise linear functions $f_{3,j}$ (j∈{1, . . . , C}) and the fourth color transform F4$^k$ is a matrix.

Each one-dimensional piecewise linear function $f_{1,j}$, $f_{2,j}$ or $f_{3,j}$ is estimated by mapping the j component of the color values belonging to an input set of color values, here E1$_j$, onto the j component of color values belonging to an output set of color values, here E2$_j$. For example, the input set of color values is the first set of color values S1 and the output set of color values is the sixth set of color values S6 when a one-dimensional piecewise linear function $f_{1,j}$ is estimated.

The disclosure is not limited by a specific method for estimating one-dimensional piecewise linear function by mapping a component of the color values belonging to an input set of color values onto a component of color values belonging to an output set of color values.

For example, the method of Cantoni et al. ("Optimal Curve Fitting With Piecewise Linear Functions," IEEE Transactions on Computers, Vol. C-20, No1, January 1971) as described in relation with FIG. 9, may be used.

FIG. 9 shows an example of a one-dimensional piecewise linear function f.

A one-dimensional piece-wise linear function $f$ is defined by intervals [$X_i$;$X_i$+1] and is linear in each interval. Note we consider here the case the intervals have equal range (equal to 1) for simplicity, but equivalent reasoning can apply to the general case (un-equal ranges). Then the values $X_i$ are considered as known.

For a given point with abscise s∈[$X_i$;$X_i$+1], the corresponding image by $f$ is y such as:

$$y=f(s)=L(X_i)+(L(X_i+1)-L(X_i))*(s-X_i)$$

One has to find the optimal values for the $L(X_i)$ for example by using a Least Square Minimization (LSM) method that minimizes the sum of the quadratic errors $Err(X_i)=(y_o-f(s_o))^2$ for the set of sample values($s_o$,$y_o$), with $s_o$∈[$X_i$; $X_i$+1] is a color values of an input set of color values and $y_o$ is a color value of an output set of color values, for each interval [$X_i$; $X_i$=1]$_{i=0, \ldots, T}$. T is either a fixed integer value or a value to be optimized.

The Least Square Minimization (LSM) method consists in solving the set of equations of partial derivative of $Err(X_i)$ respectively to $L(X_i)_{i=0, \ldots, T}$ equal to zero.

$$\frac{\partial Err}{\partial L_{X_{i-1}}} = \sum_m -2(y_m - f(s_m))(-s_m + X_i) = 0 \qquad (1)$$

with $s_m \in [X_i - 1; X_i]$ $$\frac{\partial E_{rr}}{\partial L_{X_i}} = \qquad (2)$$

$$\sum_m -2(y_m - f(s_m))(s_m - X_i + 1) - \Sigma_o 2(y_o - f(s_o))(1 - s_o + X_i) =$$

with $s_m \in [X_i - 1; X_i], s_o \in [X_i; X_i + 1]$ $$\frac{\partial Err}{\partial L_{X_i+1}} = \sum_o -2(y_o - f(s_o))(s_o - X_i) = 0 \qquad (3)$$

with $s_o \in [X_i; X_i + 1]$

The value of $L(X_i)$ determines the function $f$ on both intervals [$X_i$-1; $X_i$] and [$X_i$; $X_i$+1]:

$$y=f(s_m)=L(X_i-1)+(L(X_i)-L(X_i-1))*(s_m-_iX+1) \text{ if } s_m \in [X_{i-1};X_i] \qquad (4)$$

and $y=f(s_o)=L(X_i)+(L(X_i+1)-L(X_i))*(s_o-X_i) \text{ if } s_o \in [X_i; X_i+1]$ (5)

Once replacing $f(s_m)$ and $f(s_o)$ in equations (1-3) by their expressions given by equations (1) and (2), one obtains the following equations:

$$\begin{cases} Z_{i-1} = a_{i-1,i-1} \times L(X_i - 1) + a_{i-1,i} \times L(X_i) \\ Z_i = a_{i,i-1} \times L(X_i - 1) + a_{i,i} \times L(X_i) + a_{i,i+1} \times L(X_i + 1) \\ Z_{i+1} = a_{i+1,i} \times L(X_i) + a_{i+1,i+1} \times L(X_i + 1) \end{cases}$$

Applying the same reasoning for the other intervals, one obtains the following system:

$$\begin{pmatrix} Z_0 \\ \vdots \\ \vdots \\ \vdots \\ Z_N \end{pmatrix} = \begin{pmatrix} a_{0,0} & a_{0,1} & 0 & \cdots & & 0 \\ a_{1,0} & a_{1,0} & a_{1,2} & 0 & \ddots & \vdots \\ 0 & a_{2,1} & a_{2,2} & a_{2,3} & 0 & \vdots \\ 0 & \ddots & & & & 0 \\ \vdots & \ddots & 0 & a_{N-1,N-2} & a_{N-1,N-1} & a_{N-1,N} \\ 0 & \cdots & \cdots & 0 & a_{N,N-1} & a_{N,N} \end{pmatrix} \begin{pmatrix} L(X_0) \\ \vdots \\ \vdots \\ \vdots \\ L(X_N) \end{pmatrix}$$

The disclosure is not limited by a specific method for estimating a matrix (M or the fourth color transform F4$^k$) by mapping an input set of color values onto an output set of color values.

For example, when C equals 3 (three color components per color value), estimating a 3×3 matrix $$\begin{pmatrix} g_{0,0} & g_{0,1} & g_{0,2} \\ g_{1,0} & g_{1,1} & g_{1,2} \\ g_{2,0} & g_{2,1} & g_{2,2} \end{pmatrix}$$

by mapping an input set of color values $$\begin{pmatrix} X_0 \\ X_1 \\ X_2 \end{pmatrix}$$

onto an output set of color values $$\begin{pmatrix} Y_0 \\ Y_1 \\ Y_2 \end{pmatrix}$$

comprises solving 3 linear systems of three equations each:

$$\begin{pmatrix} Y_0 \\ Y_1 \\ Y_2 \end{pmatrix} = M \begin{pmatrix} X_0 \\ X_1 \\ X_2 \end{pmatrix}$$

with $$M = \begin{pmatrix} g_{0,0} & g_{0,1} & g_{0,2} \\ g_{1,0} & g_{1,1} & g_{1,2} \\ g_{2,0} & g_{2,1} & g_{2,2} \end{pmatrix}$$

For a set of samples $((X_0, X_1, X_2), Y_i)$, a quadratic error is $Err_i$; $=(Y_i-m_i(X_0, X_1, X_2))^2$ is calculated and a Least Mean Squares method then consists in solving a system of 9 equations built from the partial derivative of mi( ) respectively to $g_{i,j}$ with i=0, 1, 2 and j=0, 1, 2.

On FIG. 1-9, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively <<Application Specific Integrated Circuit>>, <<Field-Programmable Gate Array>>, <<Very Large Scale Integration>>, or from several integrated electronic components embedded in a device or from a blend of hardware and software components.

FIG. 10 represents an exemplary architecture of a device 10000 which may be configured to implement a method described in relation with FIG. 1-9.

Device 10000 comprises following elements that are linked together by a data and address bus 1001:
- a microprocessor 1002 (or CPU), which is, for example, a DSP (or Digital Signal Processor);
- a ROM (or Read Only Memory) 1003;
- a RAM (or Random Access Memory) 1004;
- an I/O interface 1005 for reception of data to transmit, from an application; and
- a battery 1006

According to a variant, the battery 1006 is external to the device. Each of these elements of FIG. 10 are well-known by those skilled in the art and won't be disclosed further. In each of mentioned memory, the word <<register>> used in the specification can correspond to area of small capacity (some bits) or to very large area (e.g. a whole program or large amount of received or decoded data). ROM 1003 comprises at least a program and parameters. Algorithm of the methods according to the disclosure is stored in the ROM 1003. When switched on, the CPU 1002 uploads the program in the RAM and executes the corresponding instructions.

RAM 1004 comprises, in a register, the program executed by the CPU 1002 and uploaded after switch on of the device 10000, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of the method or device for estimating a color mapping, the first and second color-graded version of the picture are obtained from a source. For example, the source belongs to a set comprising:
- a local memory (1003 or 1004), e.g. a video memory or a RAM (or Random Access Memory), a flash memory, a ROM (or Read Only Memory), a hard disk;
- a storage interface (1005), e.g. an interface with a mass storage, a RAM, a flash memory, a ROM, an optical disc or a magnetic support;
- a communication interface (1007), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

According to different embodiments, device 10000 being configured to implement the method or device for estimating a color mapping described in relation with FIG. 1-9, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).
- a mobile device;
- a communication device;
- a game device;
- a set top box;
- a TV set;
- a tablet (or tablet computer);
- a laptop;
- a display and
- a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, any device for processing a picture or a video and any other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for processing a picture comprising estimating a color mapping between a first and a second color-graded version of said picture by estimating a color mapping function that maps color values of said first color-graded version of said picture onto color values of the second color-graded version of said picture, said color mapping function comprising at least two color transforms, the color values of the first color-graded version of the picture being represented in a first color volume and the color values of the second color-graded version of said picture being represented in a second color volume, wherein estimating said color mapping function comprises:
   a) obtaining an estimate of each color transform from the color values of said first and second color-graded version of said picture;
      for the estimate of each color transform,
   b) obtaining an intermediate output set of color values by applying said estimate of the color transform to the color values of an input set of color values used for estimating said color transform;
   c) detecting whether a color value of the intermediate output set of color values exceeds a given maximal value;
   d) when at least one color value of the intermediate output set of color values exceeds the given maximal value, reducing the dynamic range of the color values of said intermediate output set of color values, and going back to step a).

2. The method of claim 1, wherein reducing comprises multiplying the estimate of the color transform by a scaling factor.

3. The method of claim 1, wherein comprises multiplying the color values of the input set of color values used for estimating said color transform by a scaling factor.

4. The method of claim 2, wherein the scaling factor is the ratio of said given maximal value over the maximum value of the color values of the input set of color values.

5. The method of claim 2, wherein the method further comprises obtaining an histogram of the color values of the intermediate output set of color values and the given maximal value is then a given percentage threshold of the very higher color values of said histogram.

6. The method of claim 1, wherein a first set of color values gathering the color values of the first color-graded version of the picture and a second set of color values gathering the color values of the second color-graded version of the picture, and wherein obtaining an estimate of each color transform comprises at iteration k, where k is an integer value:
   a) obtaining a third set of color values by applying a first color transform estimated at iteration k−1 to the first set of color values;
   b) estimating a third color transform by mapping the second set of color values onto the third set of color values;
   c) obtaining a fourth set of color values by applying said third color transform to the second set of color values;

d) estimating a first color transform by mapping the first set of color values onto said fourth set of color values; said first color transform is used for updating the first color transform previously estimated;

e) obtaining a fifth set of color values by applying said first color transform to the first set of color values; and f) estimating a second color transform by mapping the fifth set of color values onto the second set of color values.

7. The method of claim 1, wherein the color mapping function is approximated by a three-dimensional look-up-table.

8. The method of claim 1, wherein at least one color transform is approximated by a one-dimension piecewise linear function defined between a lower and upper bounds.

9. The method of claim 1, wherein at least one color transform is approximated by a one-dimensional look-up-table.

10. A computer program product comprising program code instructions to execute the steps of the method of claim 1, when this program is executed on a computer.

11. A non-transitory processor readable medium having stored therein instructions for causing a processor to perform at least the steps of the method of claim 1.

12. Non-transitory storage medium carrying instructions of program code for executing steps of the method of claim 1, when said program is executed on a computing device.

13. A device for processing a picture comprising a processor configured to estimate a color mapping between a first and a second color-graded version of said picture by estimating a color mapping function that maps the color values of said first color-graded version of said picture onto the color values of the second color-graded version of said picture, said color mapping function comprising at least two color transforms, the color values of the first color-graded version of the picture being represented in a first color volume and the color values of the second color-graded version of said picture being represented in a second color volume, characterized in that the processor is further configured to estimate said color mapping function by:

a) obtaining an estimate of each color transform from the color values of said first and second color-graded version of said picture;

for the estimate of each color transform, b) obtaining an intermediate output set of color values by applying said estimate of the color transform to the color values of an input set of color values used for estimating said color transform;

c) detecting whether a color value of the intermediate output set of color values exceeds a given maximal value;

d) when at least one color value of the intermediate output set of color values exceeds the given maximal value, reducing the dynamic range of the color values of said intermediate output set of color values, and going back to step a).

* * * * *